US011336678B2

(12) United States Patent
Jevans et al.

(10) Patent No.: US 11,336,678 B2
(45) Date of Patent: May 17, 2022

(54) METHODS AND SYSTEMS FOR SECURITY ANALYSIS OF APPLICATIONS ON MOBILE DEVICES BROUGHT INTO AN ENTERPRISE NETWORK ENVIRONMENT

(71) Applicant: Proofpoint, Inc., Sunnyvale, CA (US)

(72) Inventors: David Alexander Jevans, Menlo Park, CA (US); Suresh Kumar Basandra, San Jose, CA (US)

(73) Assignee: Proofpoint, Inc., Sunnyvale, CA (US)

( * ) Notice: Subject to any disclaimer, the term of this patent is extended or adjusted under 35 U.S.C. 154(b) by 0 days.

(21) Appl. No.: 16/730,623

(22) Filed: Dec. 30, 2019

(65) Prior Publication Data

US 2020/0137107 A1    Apr. 30, 2020

Related U.S. Application Data

(63) Continuation of application No. 16/103,144, filed on Aug. 14, 2018, now Pat. No. 10,623,435, which is a
(Continued)

(51) Int. Cl.
*H04L 29/06* (2006.01)
*G06F 21/51* (2013.01)
(Continued)

(52) U.S. Cl.
CPC .......... *H04L 63/1433* (2013.01); *G06F 21/51* (2013.01); *G06F 21/56* (2013.01);
(Continued)

(58) Field of Classification Search
CPC ........... H04L 63/1433; H04L 63/1408; H04W 12/0027; G06F 21/577; G06F 21/56; G06F 21/51
See application file for complete search history.

(56) References Cited

U.S. PATENT DOCUMENTS 7,814,554 B1 * 10/2010 Ragner ................... G06F 21/52
726/27
7,900,259 B2 * 3/2011 Jeschke ............... H04L 63/1433
726/25
(Continued)

FOREIGN PATENT DOCUMENTS

EP    3210364 A1    8/2017
EP    3213243 A1    9/2017
(Continued)

OTHER PUBLICATIONS

International Search Report and Written Opinion dated Jan. 15, 2016 in Patent Cooperation Treaty Application No. PCT/US2015/058488, filed Oct. 30, 2015, 14 pages.
(Continued)

*Primary Examiner* — Michael R Vaughan
(74) *Attorney, Agent, or Firm* — Banner & Witcoff, Ltd.

(57) ABSTRACT

Application security analysis including systems and methods for analyzing applications for risk is provided. In an example method, the applications reside on a mobile device configurable to access an enterprise system. The example method includes evaluating each of a plurality of applications variously for privacy, data leakage, and malicious behavior. The example method also includes calculating a risk score for each of the plurality of applications based on the evaluating; and automatically remediating (e.g., quarantining) the applications, of the plurality of applications, for which the risk score meets or exceeds a risk score threshold. The method may evaluate all of the applications residing on a mobile device. The method may include grouping application behaviors, for each of the applications, that indicate an increased risk into groups comprising two or more of privacy risk, a data leakage risk, an account takeover risk, a device takeover risk, and a malware risk.

20 Claims, 5 Drawing Sheets

Related U.S. Application Data continuation of application No. 15/934,951, filed on Mar. 24, 2018, now Pat. No. 10,097,576, which is a continuation of application No. 14/918,535, filed on Oct. 20, 2015, now Pat. No. 9,967,278.

(60) Provisional application No. 62/122,426, filed on Oct. 21, 2014.

(51) Int. Cl.
  *G06F 21/56* (2013.01)
  *G06F 21/57* (2013.01)
  *H04W 12/37* (2021.01)

(52) U.S. Cl.
  CPC ........ *G06F 21/577* (2013.01); *H04L 63/1408* (2013.01); *H04W 12/37* (2021.01)

(56) References Cited

U.S. PATENT DOCUMENTS

| | | | |
|---|---|---|---|
| 8,195,953 B1* | 6/2012 | Yue | G06F 21/566 713/187 |
| 8,566,932 B1 | 10/2013 | Hotta et al. | |
| 8,683,584 B1* | 3/2014 | Daswani | G06F 21/62 726/22 |
| 8,776,168 B1 | 7/2014 | Gibson et al. | |
| 8,881,293 B1 | 11/2014 | Brucker et al. | |
| 8,890,183 B2 | 11/2014 | Jorgenson | |
| 8,966,640 B1 | 2/2015 | Peddada et al. | |
| 8,984,643 B1 | 3/2015 | Krisher et al. | |
| 8,990,183 B2 | 3/2015 | Liu et al. | |
| 9,021,260 B1* | 4/2015 | Falk | G06F 21/6218 713/165 |
| 9,313,222 B2 | 4/2016 | Huang et al. | |
| 9,548,987 B1 | 1/2017 | Poole | |
| 9,652,617 B1* | 5/2017 | Evans | G06F 21/56 |
| 9,734,037 B1 | 8/2017 | McCorkendale et al. | |
| 9,838,391 B2 | 12/2017 | Jevans | |
| 9,967,278 B2 | 5/2018 | Jevans et al. | |
| 10,097,576 B2 | 10/2018 | Jevans et al. | |
| 10,270,769 B2 | 4/2019 | Jevans | |
| 10,505,933 B2 | 12/2019 | Jevans | |
| 10,623,435 B2 | 4/2020 | Jevans et al. | |
| 2003/0028363 A1 | 2/2003 | Nobili et al. | |
| 2003/0037107 A1 | 5/2003 | Maeda | |
| 2005/0026826 A1 | 2/2005 | Hoenig | |
| 2006/0224742 A1 | 10/2006 | Shahbazi | |
| 2007/0101146 A1 | 5/2007 | Louch et al. | |
| 2007/0162894 A1 | 7/2007 | Noller et al. | |
| 2008/0016339 A1* | 1/2008 | Shukla | G06F 21/566 713/164 |
| 2009/0037367 A1 | 2/2009 | Wein | |
| 2009/0305671 A1 | 12/2009 | Luft et al. | |
| 2010/0161410 A1* | 6/2010 | Tulloch | G06Q 30/0246 705/14.45 |
| 2010/0192223 A1 | 7/2010 | Ismael et al. | |
| 2011/0145920 A1 | 6/2011 | Mahaffey et al. | |
| 2012/0030750 A1 | 2/2012 | Bhargava et al. | |
| 2012/0036220 A1 | 2/2012 | Dare et al. | |
| 2012/0036552 A1 | 2/2012 | Dare et al. | |
| 2013/0085914 A1 | 4/2013 | McPherson et al. | |
| 2013/0097706 A1 | 4/2013 | Titonis et al. | |
| 2013/0111547 A1 | 5/2013 | Kraemer | |
| 2013/0167207 A1 | 6/2013 | Davis et al. | |
| 2013/0167231 A1 | 6/2013 | Raman et al. | |
| 2013/0227683 A1 | 8/2013 | Bettini et al. | |
| 2013/0263260 A1 | 10/2013 | Mahaffey et al. | |
| 2013/0318614 A1 | 11/2013 | Archer et al. | |
| 2013/0347094 A1 | 12/2013 | Bettini et al. | |
| 2014/0040628 A1 | 2/2014 | Fort et al. | |
| 2014/0058740 A1* | 2/2014 | Barnett | G06Q 50/22 705/2 |
| 2014/0066015 A1* | 3/2014 | Aissi | G06F 21/57 455/411 |
| 2014/0068720 A1* | 3/2014 | Somers | H04L 63/1441 726/4 |
| 2014/0143864 A1 | 5/2014 | Miliefsky | |
| 2014/0196150 A1 | 7/2014 | Bettini et al. | |
| 2014/0214610 A1 | 7/2014 | Moshir et al. | |
| 2014/0237545 A1 | 8/2014 | Mylavarapu et al. | |
| 2014/0337937 A1 | 11/2014 | Truskovsky et al. | |
| 2014/0359774 A1 | 12/2014 | Pulapaka et al. | |
| 2015/0026826 A1 | 1/2015 | Allegr et al. | |
| 2015/0096022 A1 | 4/2015 | Vincent et al. | |
| 2015/0172321 A1 | 6/2015 | Kirti et al. | |
| 2015/0180894 A1* | 6/2015 | Sadovsky | H04L 67/22 726/22 |
| 2015/0188949 A1 | 7/2015 | Mahaffey et al. | |
| 2015/0205962 A1 | 7/2015 | Swidowski et al. | |
| 2015/0220734 A1 | 8/2015 | Nalluri et al. | |
| 2015/0304311 A1 | 10/2015 | St. Clair | |
| 2015/0339477 A1 | 11/2015 | Abrams et al. | |
| 2015/0350240 A1 | 12/2015 | Mitchell | |
| 2016/0004864 A1* | 1/2016 | Falk | G06F 21/56 726/23 |
| 2016/0065601 A1 | 3/2016 | Gong et al. | |
| 2016/0078229 A1* | 3/2016 | Gong | H04L 63/1416 726/24 |
| 2016/0099963 A1* | 4/2016 | Mahaffey | G06F 21/554 726/25 |
| 2016/0112451 A1 | 4/2016 | Jevans | |
| 2016/0127367 A1 | 5/2016 | Jevans | |
| 2016/0142418 A1 | 5/2016 | Barton et al. | |
| 2016/0253491 A1 | 9/2016 | Fanton et al. | |
| 2017/0295199 A1* | 10/2017 | Kirti | H04L 63/1441 |
| 2018/0077158 A1 | 3/2018 | Jevans | |
| 2018/0227323 A1 | 8/2018 | Jevans et al. | |
| 2018/0359277 A1 | 12/2018 | Jevans et al. | |
| 2019/0182247 A1 | 6/2019 | Jevans | |
| 2020/0076804 A1 | 3/2020 | Jevans | |
| 2020/0137107 A1 | 4/2020 | Jevans et al. | |

FOREIGN PATENT DOCUMENTS

| | | | |
|---|---|---|---|
| WO | WO2016064930 A1 | 4/2016 | |
| WO | WO2016070135 A1 | 5/2016 | |

OTHER PUBLICATIONS

International Search Report and Written Opinion dated Jan. 19, 2016 in Patent Cooperation Treaty Application No. PCT/US2015/056534, filed Oct. 20, 2015, 10 pages.

"Extended European Search Report," European Patent Application No. 15855709.0, dated Feb. 12, 2018, 10 pages.

"Extended European Search Report," European Patent Application No. 15853504.7, dated May 17, 2018, 7 pages.

"Office Action," European Patent Application No. 15853504.7, dated Apr. 26, 2019, 6 pages.

"Office Action," European Patent Application No. 15853504.7, dated Nov. 27, 2019, 5 pages.

"Notice of Allowance," European Patent Application No. 15855709.0, dated Mar. 30, 2020, 6 pages.

Mar. 30, 2020 (EP) Communication under Rule 71(3)—Intention to Grant—App. 15855709.0.

Feb. 24, 2017 (US) Non-Final Office Action—U.S. Appl. No. 14/918,535.

Sep. 6, 2017 (US) Final Office Action—U.S. Appl. No. 14/918,535.

Jan. 11, 2018 (US) Notice of Allowance and Fees Due—U.S. Appl. No. 14/918,535.

Oct. 14, 2020 (EP) Extended EP Search Report—App. 20188847.6.

Jul. 31, 2017 (US) Notice of Allowance and Fees Due—U.S. Appl. No. 14/929,067.

* cited by examiner

METHODS AND SYSTEMS FOR SECURITY ANALYSIS OF APPLICATIONS ON MOBILE DEVICES BROUGHT INTO AN ENTERPRISE NETWORK ENVIRONMENT

CROSS-REFERENCE TO RELATED APPLICATIONS

The present application is a continuation of U.S. application Ser. No. 16/103,144, filed on Aug. 14, 2018, which is a continuation of U.S. application Ser. No. 15/934,951, filed on Mar. 24, 2018 (issued at U.S. Pat. No. 10,097,576), which is a continuation of U.S. application Ser. No. 14/918,535, filed on Oct. 20, 2015 (issued as U.S. Pat. No. 9,967,278), which claims the benefit of U.S. Provisional Application No. 62/122,426, filed on Oct. 21, 2014. The subject matter of the aforementioned applications is incorporated herein by reference for all purposes.

FIELD

The present technology is directed to computer security and risk analysis, and more particularly to systems and methods that assess and mitigate risk posed by applications that execute on mobile devices. These devices can operate on various networks and pose risks to the network if the applications on the mobile devices perform malicious or risk enhancing operations.

SUMMARY

According to various embodiments, the present technology is directed to a method comprising: (a) evaluating each of a plurality of applications for privacy, data leakage, or malicious behavior, the plurality of applications residing on a mobile device, the mobile device being configurable to access an enterprise system; (b) calculating a risk score for each of the plurality of applications based on the evaluating; (c) determining whether each of the plurality of applications meets or exceeds a risk score threshold; and (d) automatically remediating the applications, of the plurality of applications, for which the risk score meets or exceeds the risk score threshold.

According to some embodiments, the evaluating comprises grouping application behaviors, for each of the applications, that indicate an increased risk into groups comprising at least two of a privacy risk, a data leakage risk, an account takeover risk, a device takeover risk, and a malware risk.

According to various embodiments, the present technology is directed to a mobile device management system, comprising: (a) one or more enterprise devices that provide enterprise services; and (b) an application risk analysis system, comprising: (i) a processor that executes instructions stored in memory to: (1) detect mobile devices attempting to access the enterprise services; (2) conduct a risk analysis of a plurality of applications residing on the mobile devices, comprising: (a) comparing the applications to a whitelist and blacklist; (b) for the applications not on the whitelist or blacklist, monitoring application behaviors of the application; (c) grouping application behaviors that indicate an increased risk into groups comprising a privacy risk, a data leak risk, an account takeover risk, a device takeover risk, and a malware risk; (d) calculating a risk score for each of the plurality of applications based on the application behaviors; and (e) automatically remediating the applications of the plurality of applications if the risk score calculated for the application meets or exceeds a risk score threshold.

According to some embodiments, a non-transitory computer-readable storage medium is provided having embodied thereon instructions, which, when executed by at least one processor, perform steps of the method according to the present technology.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Figure 1:
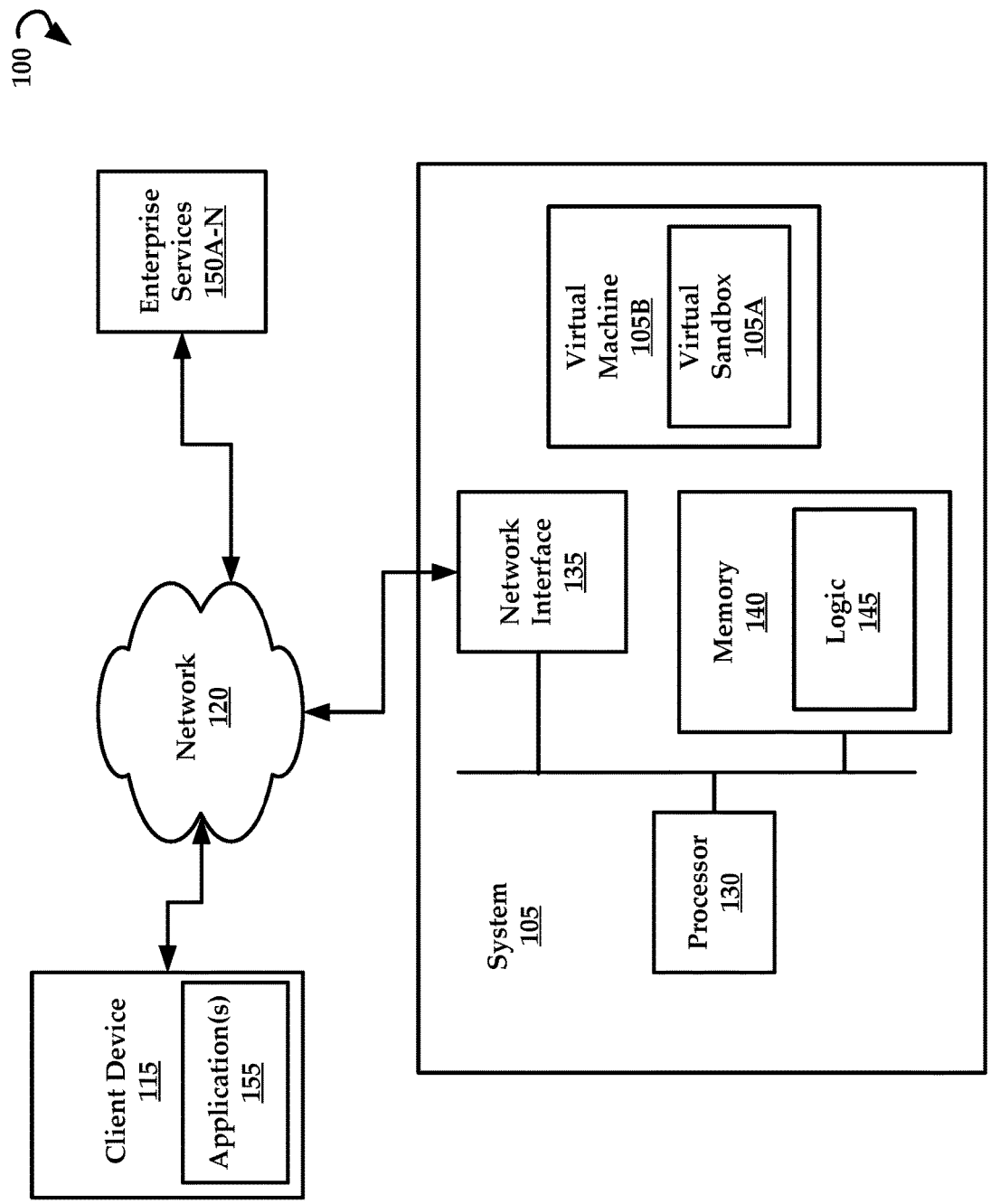
FIG. 1 is a schematic diagram of an example system for practicing aspects of the present technology.

The present disclosure relates generally to risk scoring system and methods which are configured to understand how applications on mobile devices present risk to consumers and companies.

The present disclosure can be utilized by companies that allow employees to bring their own mobile devices, such as smartphones, tablets, and wearables, into the company. It is also applicable to companies that allow mobile devices to be used by employees where the company purchases the device. Various embodiments allow companies to assess risk that applications on user devices (e.g., clients) pose to the company, and to control this risk. Various embodiments are also directed at consumer users who wish to know if applications on their phones, tablets, wearable (or other end user computing devices) pose a risk to their privacy, have risks of data leakage, or are malicious—just to name a few.

In one embodiment of the present disclosure, a risk score number is provided that provides a simple representation of a risk level associated with an application to a user or a company. This risk score may or may not be customized to the company or user, based on policies.

In one embodiment of the present disclosure, a set of risk numbers is provided that provides a detailed risk score of an application to a user or a company. These risk numbers may or may not be customized to the company or user, based on policies. These risk numbers could be characterized into different categories such as privacy risk, data leak risk, account takeover risk, device takeover risk, and malware—just to name a few.

In another embodiment of the present disclosure, the risk analysis system could connect directly to a mobile device management system or similar computer and mobile device management system, to automatically provide instructions to the system to take actions based on the risk scores. Examples of actions include quarantining or retiring the client.

In another embodiment of the present disclosure, the risk analysis system could provide detailed information about any behaviors of the application which can be correlated with external information. For example, the systems and methods can correlate websites that an application communicates with against known websites operated by criminals.

According to some embodiments, the present technology may include various processes such as a deep analysis of an application's behavior, an overall risk scoring, transmission (e.g., communications) risk scoring, risk categorization, combination of categorized scores into a single (composite) score, factoring the combined score by a publisher reputation, overriding scores (or prior to scoring) with whitelists and blacklists, and normalizing scores to a pre-defined range (for example 0-10 or 0-100)—just to name a few.

Risk scoring may have more or fewer stages than described in the various flowcharts herein, depending on the embodiment. The phases of the mechanism could be re-ordered from the example flowcharts and still have the same innovative results.

To be sure, the present technology can be implemented as a network-based service, accessible over the Internet or other computer network, where applications are collected or submitted for risk analysis. This service can be queried by reporting tools, investigators, end users, other applications, mobile device management systems, enterprise mobility management systems, data feed engines, as well as other technologies which would be known to one of ordinary skill in the art. In other embodiments, the present technology can be implemented at the device level or in an enterprise network.

These and other advantages of the present technology are provided herein with reference to the collective drawings.

FIG. 1 illustrates an exemplary architecture 100 for practicing aspects of the present technology. The architecture comprises a mobile device management system, hereinafter "system 105" that is configured to provide various functionalities, which are described in greater detail throughout this document. Generally the system 105 is configured to communicate with client devices, such as client device 115. The client device 115 may include, for example, a Smartphone, a laptop, a computer, or other similar computing device. An example of a computing device that can be utilized in accordance with the present technology is described in greater detail with respect to FIG. 5.

The system 105 may communicatively couple with the client device 115 via a public or private network, such as network 120.

Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 120 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or other networking.

The system 105 generally comprises a processor, 130, a network interface 135, and a memory 140. According to some embodiments, the memory 140 comprises logic (e.g., instructions) 145 that can be executed by the processor 130 to perform various methods, which are described in greater detail herein.

In some embodiments, the system 105 can facilitate a virtual sandbox 105A that is executed by a virtual machine 105B.

It will be understood that the functionalities described herein, which are attributed to the system 105 may also be executed within the client device 115. That is, the client device 115 may be programmed to execute the functionalities described herein. In other instances, the system 105 and client device 115 may cooperate to provide the functionalities described herein, such that the client device 115 is provided with a client-side application that interacts with the system 105 such that the system 105 and client device 115 operate in a client/server relationship. Complex computational features may be executed by the server 105, while simple operations that require fewer computational resources may be executed by the client device 115, such as data gathering and data display.

In some embodiments, the client device 115 can be utilized by a user to access various enterprise services 150A-N. The client device 115 can also store and execute one or more applications, such as application(s) 155.

The execution of the application(s) 155 by the client may result in deleterious effects such as data leakage, malware, account takeover and other effects described herein. These effects can cause damage not only to the client device 115, but also the enterprise services 150A-N when the client device 115 accesses the enterprise services 150A-N over the network 120.

Various embodiments of the present disclosure provides for the system 105 to determine what applications reside on the client device 115 and perform one or more security verification processes on the applications to determine if the client device 115 can be allowed to access the enterprise services 150A-N.

The applications can be tested in a variety of manners and scored variously by the system 105 to determine their risk levels. Again, these risks involve not only possible deleterious effects to the client device 115 but also other clients on the network 120 and any enterprise services 150A-N.

Figure 2:
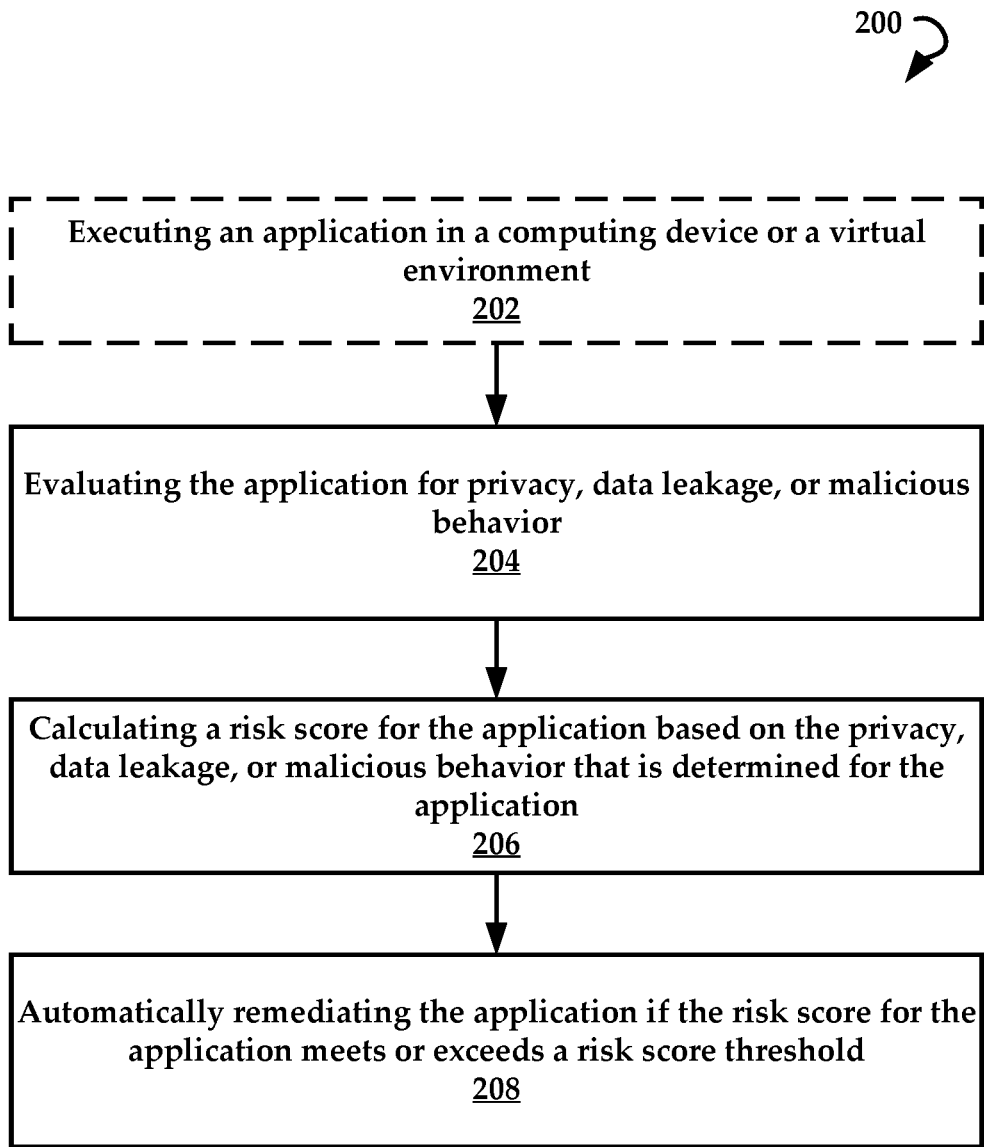
FIG. 2 is a flowchart of a method of application risk analysis.

FIG. 2 is a flowchart of an example method 200 that can be implemented within the system 105 described above. In one example, the method begins when a client device attempts to access an enterprise network and one or more enterprise services such as email, databases, security, or other services. The system 105 can evaluate applications on the client device to determine a risk level therefor. In another example, the method begins when a client device desires to determine a risk level for one or more applications that are available for download (or already installed on the client device).

In either of these examples, the method may include executing at operation 202, an application in a computing device or a virtual environment. An example virtual environment could include a sandbox environment on a virtual machine created by the system 105. In another embodiment, the application can be executed on a test client device and monitored by the system 105 for various behaviors, as will be described in greater detail infra.

In some embodiments, the application can be evaluated without directly or indirectly executing the application in a sandbox or on a physical computing device. For example, some facets of risk can be evaluated without executing the application such as developer reputation analysis or an analysis of the name of the application against a black or white list of application names. Furthermore, static analysis may be performed, in some embodiments, without executing the application. Thus, operation 202 is optional (shown dashed) based upon the type of application risk analysis/evaluation being performed.

The method may comprise evaluating at operation 204 the application for privacy, data leakage, or malicious behavior—just to name a few. In general, with respect to privacy, an application that leaks a user's private information to a third party server is a privacy risk. Information usually considered private includes, but is not limited to, geolocation data, network connectivity, email addresses, contacts, and other user specific information. Other types of private information include health information, banking information, authentication information, and so forth. Data leakage can refer generally to an application has the potential to transmit data to a third party server or a network observer. In more detail, applications that transmit unencrypted data, or connect to file sharing services have a high data leak risk. Similarly, some applications can automatically send data from a device, or allow users to upload data to untrusted third party services. These applications can pose data leak risk.

With respect to malicious behavior, malware is a category of application that was built with criminal intent. Applications that place phone calls or send text messages to expensive paid offshore numbers are common examples. Applications that use a mobile device as a proxy for spam or phishing, send users to phishing websites, or use known brand names without their permission are also malware. Again, these are merely examples of malicious behaviors that can be detected by the system 105. Thus, the system 105 is configured to evaluate the application for a wide variety of known malware related activities.

Each of these application facets such as privacy, data leakage, or malicious behavior are comprised of numerous application behaviors for which the system 105 will monitor and log. As these behaviors are identified, the system 105 can score these behaviors and create individual scores for privacy, data leakage, or malicious behavior. In various embodiments, the calculation take into account (e.g., in the risk score calculation) not only the type of risk presented, but also the nature of the risk. For example, the severity of a risk associated with permissions will be higher if the permissions' risk involves the application accessing the device's camera as compared to the application merely accessing the Internet. In another example, the risk score can be scaled higher if the application looks up the device's hardware identification and allows tracking of the user and the device, or, for another example, the application attempts to write device security settings which is usually malicious. In another non-limiting example, merely accessing a network connection by the application presents one level of risk factored in, whereas an application that can read the low-level system log file, which could expose other application data is given a much higher weight for affecting the risk score. Other examples and factors for the score calculation are described further herein.

Next, the method can include the system 105 calculating, at operation 206, a risk score for the application based on the privacy, data leakage, or malicious behavior that is determined for the application. In some embodiments, this score is a composite (e.g., average or weighted combination) of the privacy, data leakage, or malicious behavior scores calculated from the various behaviors determined for the application. The score can be normalized to a number that falls within a range of zero to 10, where zero indicates no risk whatsoever and 10 indicates an extreme danger.

The method may comprise the system 105 automatically, at operation 208, remediating the application if the risk score for the application meets or exceeds a risk score threshold. For example, a risk score threshold of five can be set in one embodiment. Thus, any application with a risk score that exceeds five will be remediated (e.g., quarantined or retired—to name a few possible remediation options).

Quarantining a mobile device (e.g., client device) is a remediation option when administrator-defined risk threshold settings are exceeded. The system 105 can temporarily restricts access to enterprise services by using administrator defined labels (e.g. "Quarantine-Level-1") in the system. Devices are automatically removed from quarantine when the user brings the device back into compliance, typically by removing the risky application.

Figure 3:
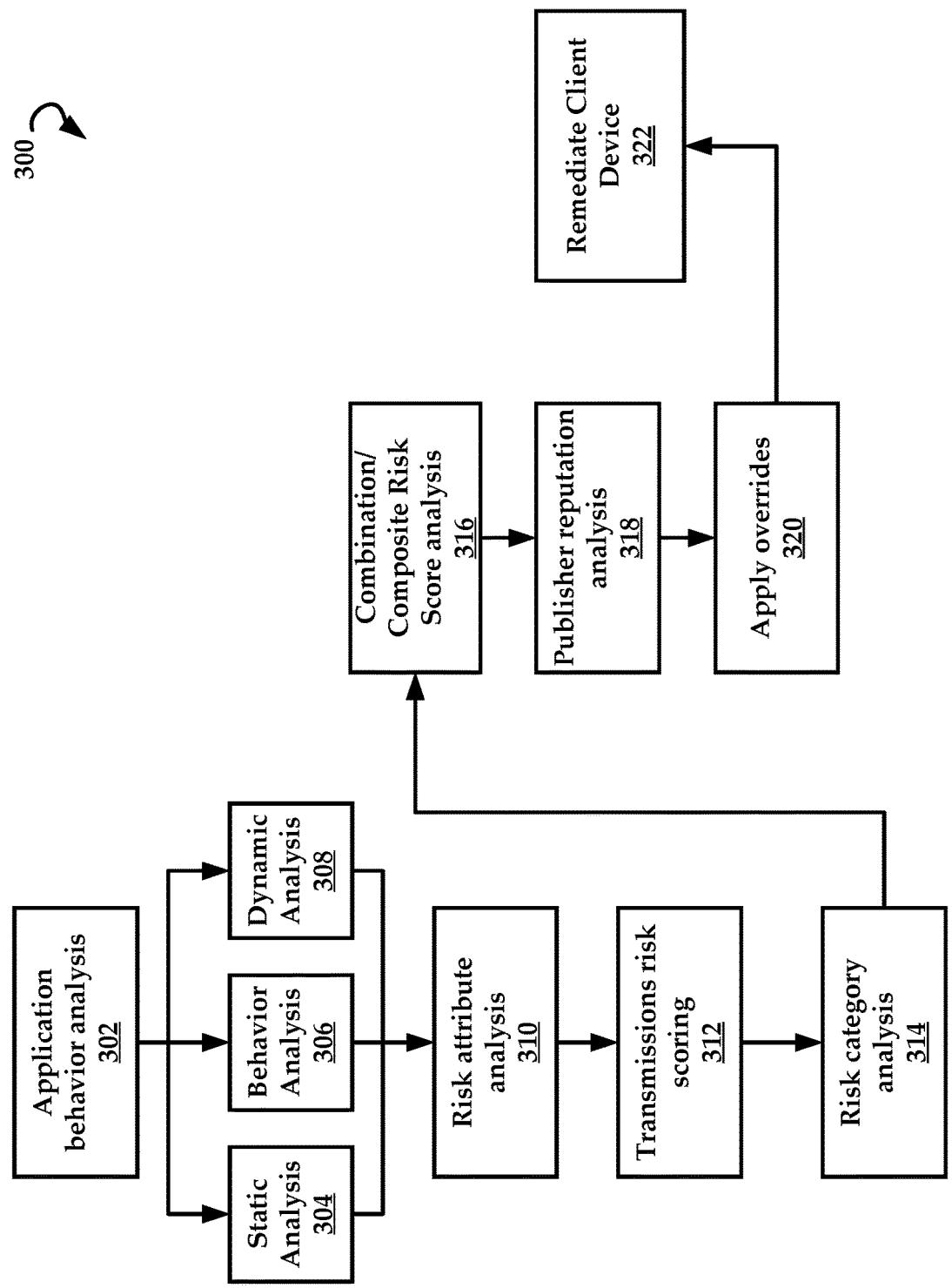
FIG. 3 is schematic flow diagram of a method for application risk analysis and device remediation (e.g. quarantining).

An alternative to quarantining the client device includes retiring the device. A retired device will no longer be allowed to access managed enterprise resources, such as email, VPN and other enterprise services. In other embodiments, a warning can be transmitted to the client device FIG. 3 illustrates another example application risk analysis method 300 that can be performed using the system 105 of FIG. 1. In one embodiment, the system 105 performs seven distinct categories of analysis on an application before determining an overall risk score. The application can undergo static, dynamic, and/or behavioral analysis to determine whether the application contacts remote servers and sites, seeks permission to access private user information, encrypts information when transmitted, and the publisher's reputation—just to name a few. Again, other permutations of application behaviors can also likewise be analyzed.

In an initial operation 302 analysis of application behavior is performed. To be sure, mobile applications are designed to perform a number of operations, while also interacting with remote databases, servers and services, to deliver specific functionality. Each individual operation is known as an application behavior.

In the one embodiment, the system 105 categorizes five categories of malicious app behaviors, which include, but are not limited to data leakage, account takeover, device takeover, privacy, and malware. Each of these analyses will be described in greater detail below.

On a more generalized level, the system 105 can perform static analyses, behavior analysis, and dynamic analyses. In general, a static analysis at operation 304 can be performed to determine any differences between declared permissions of an application, and what the code for the application specifies. With risky applications there is frequently a disparity between stated permissions and coded permissions. As described above, static analysis may be performed without executing the application.

With respect to behavior analyses at operation 306, the application can be executed in a physical or virtual environment (such as a sandbox) to understand operations of the application, what data is accessed by the application (on the client device or on a network resource), and where data is sent during execution of the application.

A dynamic analysis at operation 308 involves the system 105 analyzing the behaviors of the application over time. This can include the system 105 simulating different user behaviors and different network topologies against the application. For a non-limiting example of such simulating, the system 105 may create "fake" email, social media or other accounts for the mobile device and/or user along with fake credentials, and then monitor whether an application on the mobile device (or other devices) attempt to access the fake account and attempt to engage in other suspicious activity. In various embodiments, this suspicious activity negatively affects the application and publisher score.

In another embodiment, the method comprises the system 105 performing a risk scoring and/or risk attribute analysis at operation 310. By definition, a risk attribute is a detailed action taken by an application that contributes to increasing risk. Many permutations of risk attributes may be analyzed and contribute to the overall risk score of an application. There may be more or less risk attributes, depending on the embodiment. Typically, the term risk attribute is synonymous with risky behavior of an application. For example, an application that is likely to leak data is more risky than an application that does not leak data. Other examples of risky behavior are described throughout this description.

Another score that can be calculated by the system 105 includes performing a transmissions risk scoring at operation 312 (also referred to as network reputation scoring). In some embodiments, this includes the system 105 conducting an analysis of how the application communicates with websites, servers, IP addresses, and other network resources. For instance, a server that is operated by a trusted company will have a better network reputation than a server that is known to host phishing or malware sites, or has been involved in electronic crime activities. If an application is found to communicate with a risky network resource, the application's overall risk score will increase, as well as any individual scores calculated for transmissions risk. Thus, in some embodiments, the transmissions risk can include a score for a network resource(s) contacted or utilized by the application.

In another embodiment, the method can include performing a risk category analysis at operation 314 where the system 105 groups pluralities of dangerous application behaviors into a plurality of specific risk categories. In one embodiment, the risk categories can include privacy risk, data leak risk, account takeover risk, device takeover risk and malware risk. These scores can be utilized by the system to calculate a component risk score. In one embodiment, a highest of these individual risk scores becomes the composite risk score. In other embodiments there could be more or fewer risk categories added to the component risk score. In one embodiment, there is no component risk score, but application behaviors are grouped into risk categories for future reference.

An account takeover risk occurs when an application has access or control to authentication credentials for a user account. One example includes an application that can transmit usernames and passwords for email access. Other examples include authentication credentials for enterprise services or social networks. The account takeover risk may include accessing an online account associated with the user of the mobile device in an unauthorized way (i.e., in way that is not authorized by the user). For instance, the account takeover risk may include accessing the user's account in a way beyond the authorization of a user, such as only being authorized to place an image in a cloud file storage account, but also accessing other files at that account. In some embodiments, the account takeover risk includes accessing of an online account not associated with the user of the mobile device or authorized for the application.

Data leak risk involves an application that has potential to transmit data to a third party server or a network observer. Applications that transmit unencrypted data to any third party can cause a data leak risk. Other examples include applications that transmit data from a device or allow a user to upload data to untrusted third party services.

With respect to device takeover risks, an application that can be (or is known to) used by a third party to take control of the client device are known as a takeover risk. Indicative actions of an application that has takeover risk include transmission of hardware identification information or violation of policies for accessing restricted application programming interfaces (APIs). Other example actions include any attempt to jailbreak or root the device are indicative of high risk. These actions are performed when the device is being used to install applications or perform tasks not allowed by the hardware manufacturer or network administrator.

Another risk involves malware. As mentioned above, malware is a category of application or service that was built with criminal intent. For example, applications that make phone calls or send text messages to expensive paid offshore numbers are malware. Applications that use a mobile device as a proxy for spam or phishing, send users to phishing websites, or use known brand names without their permission are also malware. These are merely examples of a few types of malware and are provided as examples only. One of ordinary skill in the art will appreciate that other types of malware can be detected and included by the system 105.

A privacy risk includes an application that leaks or exposes sensitive information to a third party. Examples of private information include, but are not limited to, geolocation data, names, addresses, email addresses, contacts, network connectivity, account numbers, or any sensitive information designated under a state and/or federal law.

The method can also include at operation 316, a combination or composite (risk) score may be determined that summarizes the component risk score. The composite aspect may comprise, for example, an average or weighted combination of the privacy, data leakage, or malicious behavior (component) scores calculated from the various behaviors determined for the application. The composite score can be normalized to a number that falls within a range of zero to 10, where zero indicates no risk whatsoever and 10 indicates an extreme danger.

In some embodiments, the method can include defining attribute settings for the application. If any of these attributes are present, a notification to a system administrator can occur. These attributes can also cause behavioral overrides, i.e., overriding the score otherwise calculated. In some embodiments, the attributes may include variously, for example, storing credentials without encryption; accessing Bluetooth sharing; accessing the Internet, external storage, or cloud file storage (for various providers); accessing an input method editor/Unique Device Identifier (IME/UDID); sending International Mobile Equipment Identity number (IMEI) which may be a serial number which identifies the user's mobile device; attempting to root or jailbreak the device; malware or spyware; accessing the user's address book, contacts, calendar, camera, or microphone Short Message Service (SMS) archive; and the application attempting to access analytics and crash reporting associate with the mobile device and user.

In some embodiments, the method can include comparing various attributes of an application to a whitelist or blacklist. Applications matching entries on the whitelist are automatically assigned a risk score of zero. Conversely, matching entries on the whitelist are automatically assigned a risk score of ten, regardless of their behavior. These applications can be defined in the lists by a system administrator or other information source that identifies safe and dangerous applications.

In one embodiment, the method can include performing, at operation 318, an analysis of publisher reputation. A publisher reputation score evaluates an overall risk of the complete catalogue of applications and their versions released by a specific publisher. Publishers that have released a single application, and those with very few downloads, will receive a higher publisher risk score (and lower reputation) than a publisher with a numerous applications and thousands of downloads and positive user reviews. Publisher reputation is used as one factor in determining the risk of a specific, individual application (e.g., in calculating the risk score for an application). For example, two applications that have the exact same behaviors and risk scores will have different risk scores if one comes from an unknown publisher, and one comes from a known publisher such as Twitter, Inc.™ The application developer can be placed onto the blacklist if their publisher reputation score does not meet or exceed a publisher reputation score threshold. In some embodiments, the method includes comparing the application to a blacklist of applications, wherein, if at least one of the applications and an application developer of the application is listed on the blacklist, the application is automatically remediated.

According to some embodiments, the method can include an override process where applications are initially scored by the system 105. Next, application overrides can be applied at operation 320 where administrators and users can be notified if certain behaviors are not permitted or are considered by the system 105 to be risky.

As mentioned above, the client device executing the application can be quarantined or retired based on these overrides. In one embodiment a behavior override can occur when the application accesses a service or network resource that is restricted. For example, a system administrator can determine that a cloud storage service is restricted. The system 105 can warn the user when an attempt to access this resource occurs, as well as warn an administrator. In some embodiments, the client device is quarantined or retired.

In one embodiment, the method includes the quarantining or other remediation, at operation 322, of the client (e.g., mobile) device. In some embodiments, the quarantining or other remediation may be for a period of time (e.g., days) to give a user time to take steps (e.g., remove risky application (s)) to place the mobile device into compliance where quarantining or other remediation would no longer be warranted. In some embodiments, during the period, the user may be given access to email in order to notify the user that a fix is required to bring the device into compliance, and optionally, to also inform the user of the consequences of failing to do so. If the user fails to take such steps, in this example, the device may be retired or other unconditional quarantining or other remediation may be instituted.

Additional actions that can occur when a device or application violates a policy include, but are not limited to, locking of the device. For example, when an application exceeds administrator-defined risk threshold settings, a device can be locked, forcing the user to log out and log back in with the device password. Locking a device may also keep a user from accessing the device until it is unlocked by a third party administrator or software or online service.

Remediation can also occur. When an application exceeds administrator-defined risk thresholds several remediation actions may be taken such as notify the user, warn the user, retire the device, or quarantine the device. There may be more remediation options, depending on the embodiment.

Retiring a device is a remediation option when administrator-defined risk threshold settings are exceeded in which the user is removed from the mobile device management (MDM) system, cutting off all MDM-managed enterprise access, such as email, calendaring, corporate applications—just to name a few.

Quarantining a mobile device is a remediation option when administrator-defined risk threshold settings are exceeded in which the system temporarily restricts access to MDM-managed enterprise services by using administrator defined labels (e.g., "Quarantine-Level-1") in the MDM system. Devices are automatically removed from quarantine when the user brings the device back into compliance, typically by removing the risky application. Thus, in some embodiments, the system 105 can inventory the applications on each client device before it accesses any enterprise or network resources.

Figure 4:
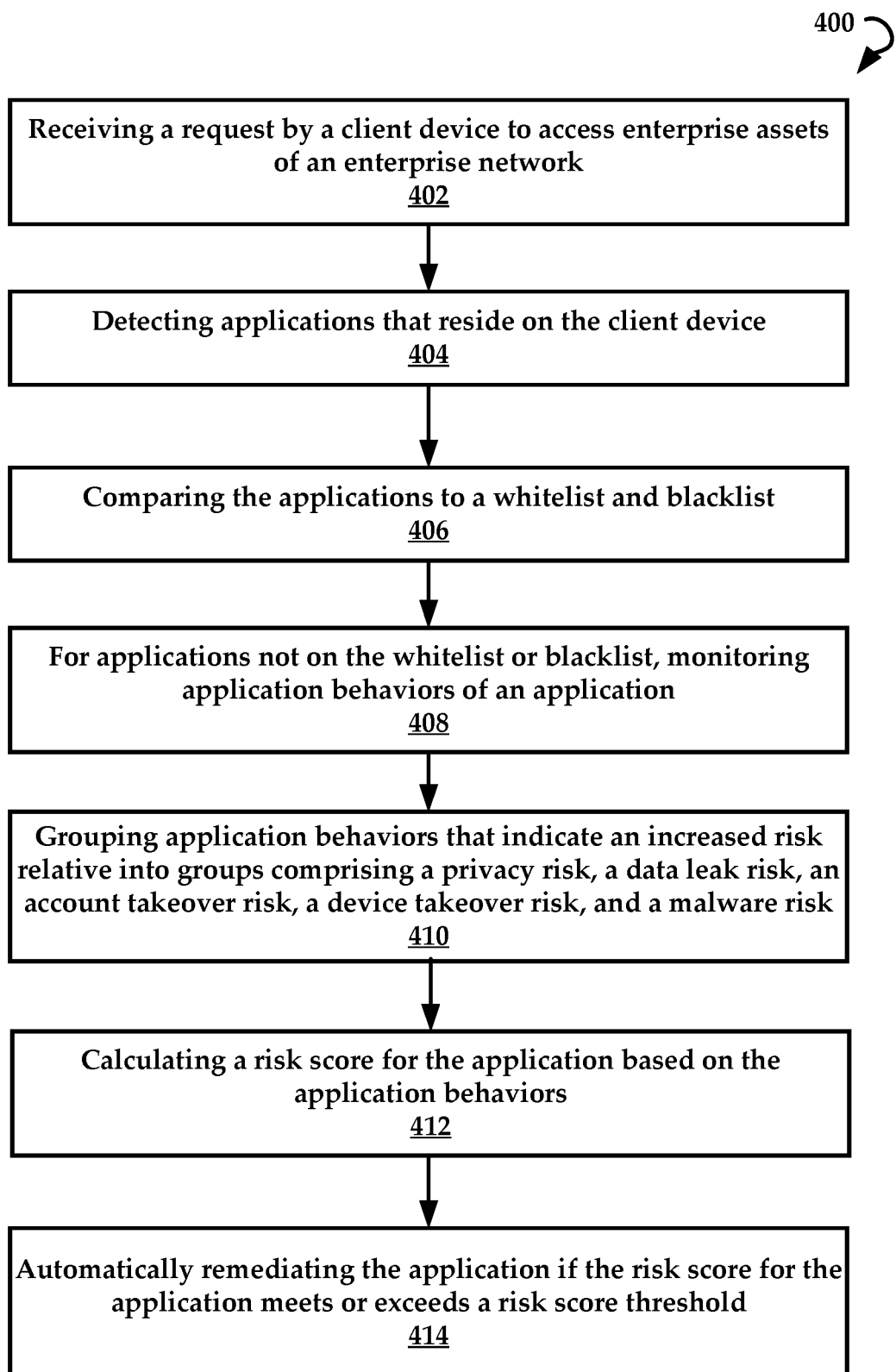
FIG. 4 is a flowchart of another method of application risk analysis.

FIG. 4 is a flowchart for an exemplary method 400 for determining risk for an application executing on a client device that is attempting to access network resources.

In one embodiment, the method includes receiving, at operation 402, a request by a client device to access enterprise assets of an enterprise network. Once the request is received, the method includes detecting, at operation 404, applications that reside on the client device.

The method can then include a process for determining a risk score for applications detected on the client device. The method can include initially comparing, at operation 406, the applications to a whitelist and blacklist. For applications not on the whitelist or blacklist, the method can include monitoring, at operation 408, application behaviors of an application. Again, this could include examining input and/or output of the application, as well as the network resources access by the application (e.g., third party servers not within the enterprise network).

The method can also include grouping, at operation 410, application behaviors that indicate an increased risk relative into groups comprising a privacy risk, a data leak risk, an account takeover risk, a device takeover risk, and/or a malware risk.

Once the behaviors are grouped, the method can include calculating, at operation 412, a risk score for the application based on the application behaviors. In some embodiments, an intermediate step of calculating scores for each of the risk groups can occur. The general risk score can be a composite of these individual risk scores, selected combinations of the individual scores, weighted portions of individual scores, and combinations thereof. A weighted score can be achieved by multiplying a risk group score by a weighting coefficient. For example, if one desires the privacy risk score to be weighted more heavily, a coefficient of 0.9 can be applied to the privacy risk score. Conversely, if one desires the data leak risk score to be weighted less heavily, a coefficient of 0.2 can be applied to the data leak risk score.

The method may include automatically remediating (e.g., quarantining or other remediating options), at operation 414, the application if the risk score for the application meets or exceeds a risk score threshold.

It will be understood that not all steps illustrated in FIGS. 2-4 are required in each embodiment. Various permutations and changes to the methods are contemplated.

As used herein, the term "engine", "system", "client", "module", "controller", or "application" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality.

Figure 5:
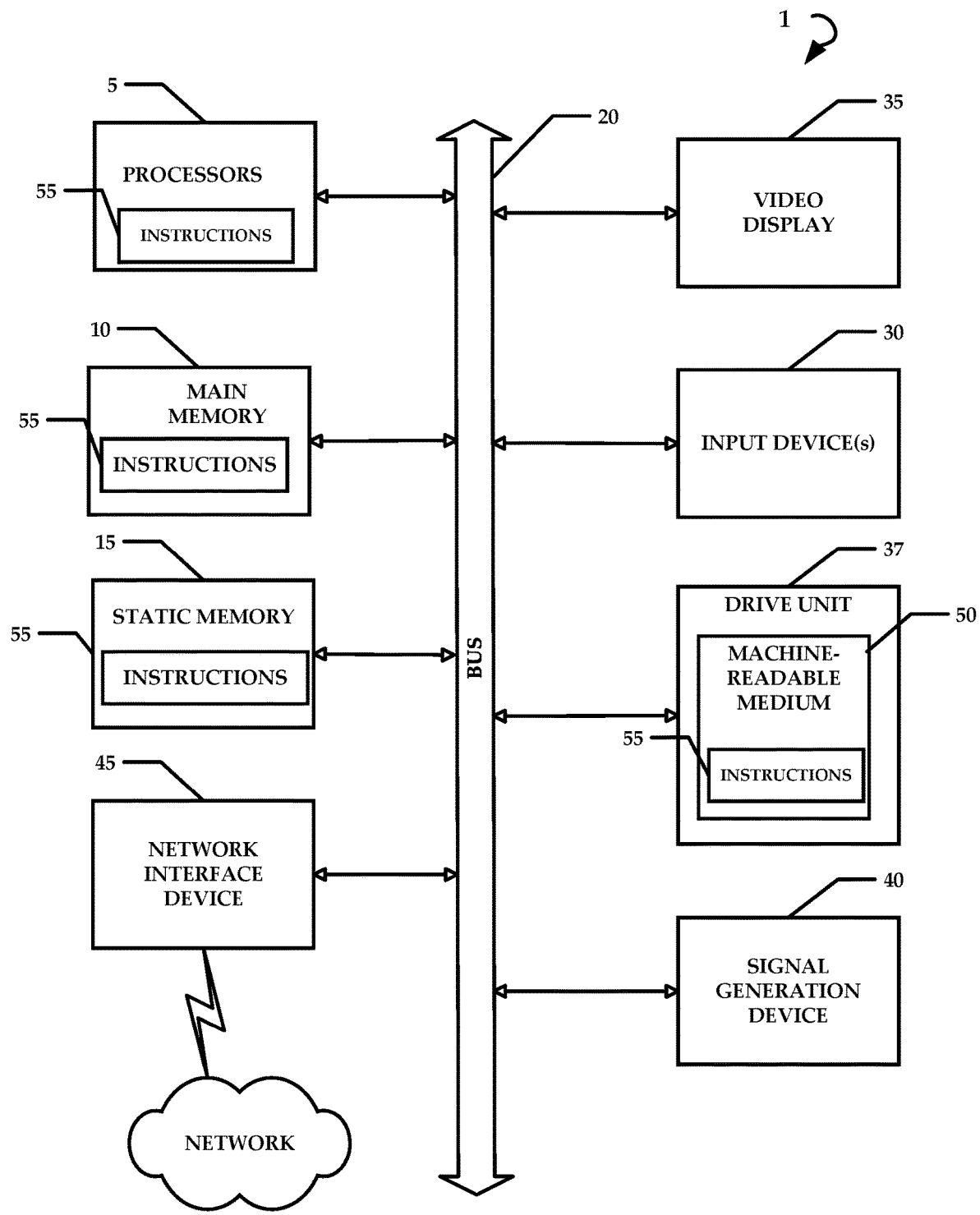
FIG. 5 is a schematic diagram of an example computer device that can be utilized to implement aspects of the present technology.

FIG. 5 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be, for example, a base station, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processors 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alphanumeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processors 5 during execution thereof by the computer system 1. The main memory 10 and the processors 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Not all components of the computer system 1 are required and thus portions of the computer system 1 can be removed if not needed, such as Input/Output (I/O) devices (e.g., input device(s) 30). One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present. The description herein is illustrative and not restrictive. Many variations of the technology will become apparent to those of skill in the art upon review of this disclosure. For example, the technology is not limited to use for stopping email threats, but applies to any messaging threats including email, social media, instant messaging, and chat.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method comprising:
automatically performing, by a computing device, an analysis of each of a plurality of applications residing on a mobile device of a user, wherein performing the analysis includes performing, for each of the plurality of applications, each of: a risk attribute analysis, a transmission risk analysis, and a risk category analysis, wherein the analysis results in a risk attribute score, a transmission risk score, and a component risk score, respectively, for each of the plurality of applications;
based on the analysis, automatically calculating, by the computing device, a score for each of the plurality of applications, wherein calculating the score comprises computing a weighted combination of the risk attribute score, the transmission risk score, and the component risk score;
automatically determining, by the computing device, whether each of the plurality of applications meets or exceeds a score threshold; and
automatically remediating, by the computing device, each of the applications, of the plurality of applications, for which the score meets or exceeds the score threshold.

2. The method of claim 1, wherein performing the analysis further comprises analyzing each of the plurality of applications residing on the mobile device of the user for leaking of private information to another system, and wherein the private information comprises geolocation data for the user.

3. The method of claim 2, wherein the private information comprises unencrypted data.

4. The method of claim 2, wherein the private information further comprises sensitive information designated under a state or federal law.

5. The method of claim 2, wherein the private information comprises health information, banking information, contacts information, geolocation data, and sensitive information designated under a state or federal law.

6. The method of claim 1, wherein the score is a composite risk score for each of the plurality of applications.

7. The method of claim 6, wherein the composite risk score is based on analysis of privacy, data leakage, and malicious behavior and scores calculated based on respective analyses thereof.

8. The method of claim 7, wherein the composite risk score comprises an average of the privacy, data leakage, or malicious behavior scores.

9. The method of claim 6, wherein the composite risk score is a weighted score calculated by multiplying each of privacy, data leakage, and malicious behavior scores by a weighting coefficient.

10. The method of claim 9, wherein the privacy risk score is weighted more heavily such that a coefficient of 0.9 is applied to the privacy risk score.

11. The method of claim 1, wherein the automatically remediating each of the applications of the plurality of applications for which the score meets or exceeds the score threshold further comprises quarantining the mobile device for a period of time to give a user time to take steps to place the mobile device into condition such that no application on the mobile device meets or exceeds the score threshold.

12. The method of claim 1, further comprising when at least one of the applications on the mobile device of the user exceeds the score threshold, quarantining the mobile device and cutting off all enterprise access including email, calendaring, and corporate networked applications, wherein cutting off all enterprise access comprises allowing access to emails notifying the user that a fix is required within in a period of time to remove the mobile device from quarantine, and that if the user fails to effect the fix, the mobile device will be retired or unconditionally quarantined.

13. The method of claim 1, wherein performing the analysis includes performing a static analysis of each of the plurality of applications, and wherein performing the static analysis of each of the plurality of applications comprises analyzing declared permissions for each of the plurality of applications in comparison with actual resources of the mobile device that are utilized by the respective application.

14. The method of claim 1, wherein performing the analysis includes performing a dynamic analysis of each of the plurality of applications, and wherein the dynamic analysis comprises executing each of the plurality of applications in a virtual environment and further comprises analyzing application behaviors for each of the plurality of applications over a period of time.

15. The method of claim 1, wherein performing the analysis comprises performing a behavioral analysis of each of the plurality of applications, and wherein the behavioral analysis comprises executing each of the plurality of applications in a virtual environment and monitoring input and output operations of the respective application.

16. The method of claim 1, wherein performing the risk attribute analysis comprises identifying characteristics of each of the plurality of applications that make the corresponding application more or less risky, and wherein at least one of the characteristics comprises a likelihood of the corresponding application to leak data.

17. The method of claim 1, wherein performing the transmission risk analysis comprises conducting an analysis of how each of the plurality of applications communicates with other network resources.

18. The method of claim 1, wherein performing the risk category analysis comprises:
identifying, for each of the plurality of applications, each of: a privacy risk, a data leak risk, an account takeover risk, a device takeover risk, and a malware risk, and
computing, for each of the plurality of applications and based on each of the privacy risk, the data leak risk, the account takeover risk, the device takeover risk, and the malware risk, the component risk score.

19. A system comprising:
one or more enterprise devices that provide enterprise services; and an application analysis system, comprising a processor that executes instructions stored in memory to:
- perform an analysis of each of a plurality of applications residing on the one or more enterprise devices of a user, wherein performing the analysis includes performing, for each of the plurality of applications, each of: a risk attribute analysis, a transmission risk analysis, and a risk category analysis, wherein the analysis results in a risk attribute score, a transmission risk score, and a component risk score, respectively, for each of the plurality of applications;
- based on the analysis, calculate a score for each of the plurality of applications wherein calculating the score comprises computing a weighted combination of the risk attribute score, the transmission risk score, and the component risk score;
- determine whether each of the plurality of applications meets or exceeds a score threshold; and
- automatically remediate each of the applications, of the plurality of applications, for which the score meets or exceeds the score threshold.

20. A non-transitory computer-readable storage medium having embodied thereon instructions, which, when executed by at least one processor, perform steps of a method, the method comprising:
- automatically performing an analysis of each of a plurality of applications residing on a mobile device of a user, wherein performing the analysis includes performing, for each of the plurality of applications, each of: a risk attribute analysis, a transmission risk analysis, and a risk category analysis, wherein the analysis results in a risk attribute score, a transmission risk score, and a component risk score, respectively, for each of the plurality of applications;
- based on the analysis, automatically calculating a score for each of the plurality of applications, wherein calculating the score comprises computing a weighted combination of the risk attribute score, the transmission risk score, and the component risk score;
- automatically determining whether each of the plurality of applications meets or exceeds a score threshold; and
- automatically remediating each of the applications, of the plurality of applications, for which the score meets or exceeds the score threshold.

* * * * *